Aug. 16, 1932.     J. O. SEIFERT     1,871,749
APPARATUS FOR CLOSING AND SEALING RECEPTACLES
Filed Dec. 5, 1930     2 Sheets-Sheet 1

Inventor
John O. Seifert

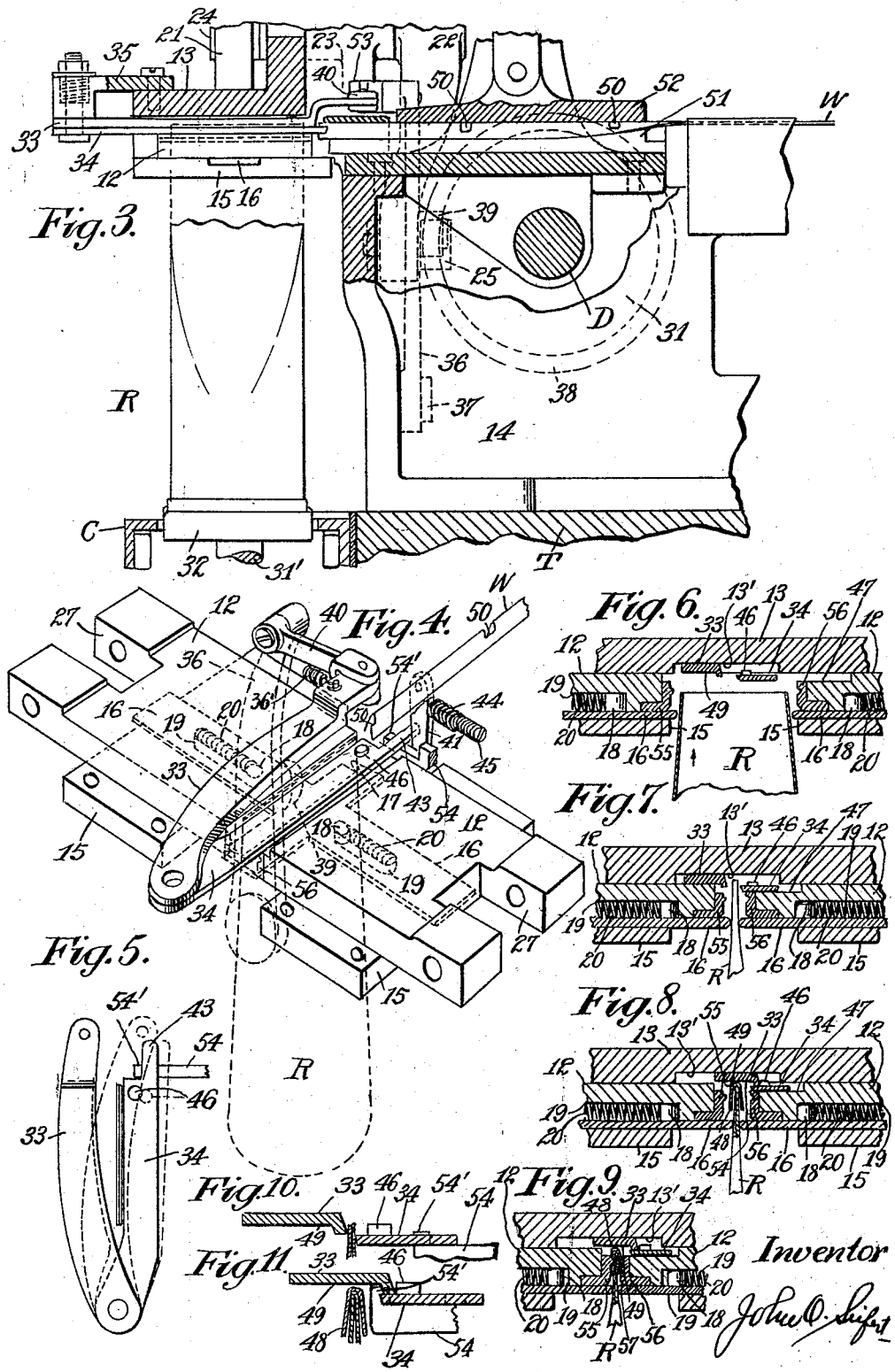

Patented Aug. 16, 1932

1,871,749

UNITED STATES PATENT OFFICE

JOHN O. SEIFERT, OF FLUSHING, NEW YORK, N. Y., ASSIGNOR, BY MESNE ASSIGNMENTS, TO AMERICAN SEALCONE CORPORATION, OF NEW YORK, N. Y., A CORPORATION OF NEW YORK

APPARATUS FOR CLOSING AND SEALING RECEPTACLES

Application filed December 5, 1930. Serial No. 500,177.

This invention relates to apparatus for closing and sealing receptacles or containers having a conical body formed of a single or several layers of material, such as paper, wherein the open end through which the contents is filled into the receptacle is collapsed to close the same by squeezing together the opposite marginal portions at the opening and then placing the closure member of V-shape in cross section upon the collapsed receptacle end and sealing the closure member thereto. In order that the closure will seal the collapsed receptacle end from the atmosphere and prevent leakage should the receptacle be inverted it is essential that the opposite edges of the collapsed receptacle end extend in the same straight plane so that the closure will seat in intimate contact with the same. Due to imperfections in the blank from which the receptacle body is made, or in the forming of the body, or in the collapsing of the receptacle end, the edges of the collapsed receptacle end will extend in an uneven or irregular plane with the result that the closure member will not seat in intimate contact with such edges and a consequent leakage of the receptacle.

It is the principle object of the invention to provide even edges at the collapsed receptacle end against which the closure member intimately seats when engaged thereon before sealing the closure member to the receptacle to assure a positive liquid tight seal and overcome the expense and necessity of providing an exact formed died-out blank for forming a receptacle whereby the collapsing of the open end thereof will ordinarily bring together the edges of the opposite marginal portions in an even plane.

In carrying out the invention there is provided severing means comprising a pair of cutters superposed to a pair of receptacle collapsing members of receptacle collapsing and closure member sealing means, and relative to which cutters the collapsed receptacle end is positioned, and said cutters being operated for severing the upper portion of the collapsed end in sequence to collapsing and positioning the receptacle relative to said cutters. After severing a collapsed end portion of the receptacle the cutters are postioned from the severed receptacle end to permit the placing of a closure member on said receptacle end when the receptacle is moved toward the positioned cutters to engage the closure member against one of the cutters abutting the closure member into intimate contact with the severed edges of the receptacle and in such position the closure member is sealed to the receptacle by a part of the receptacle collapsing and closure member sealing means.

In the drawings accompanying and forming a part of this application Figure 1 is a front elevation, partly in section, of the apparatus for carrying out the invention, and showing in dotted lines the positions the parts assume in collapsing a receptacle just prior to the severing operation.

Figure 3 is a view of the apparatus in cross section taken on line 3—3 of Figure 1 looking in the direction of the arrow.

Figure 4 is a perspective view of the receptacle collapsing and closure sealing means and in position to collapse the open end of a receptacle, and showing the severing means in normal position relative thereto and a closure member being fed to the receptacle.

Figure 5 is a view of the severing means looking at the top thereof and showing the same in normal position in full lines and the fully actuated position in dotted lines.

Figure 6 is a cross sectional view of the collapsing, closure member, sealing and severing means in normal position and showing the open end of a receptacle positioned relative to the colapsing means.

Figure 7 is a view similar to Figure 6 but showing the parts actuated to collapse the receptacle and the receptacle end in collapsed condition and positioned relative to the severing means.

Figure 8 is a view similar to Figures 6 and 7 but showing the severing means in actuated position with a closure member placed on the severed receptacle end in abutting relation to a part of the severing means.

Figure 9 is a view similar to Figures 6, 7 and 8 showing the closure member being sealed to the receptacle.

Figure 1:
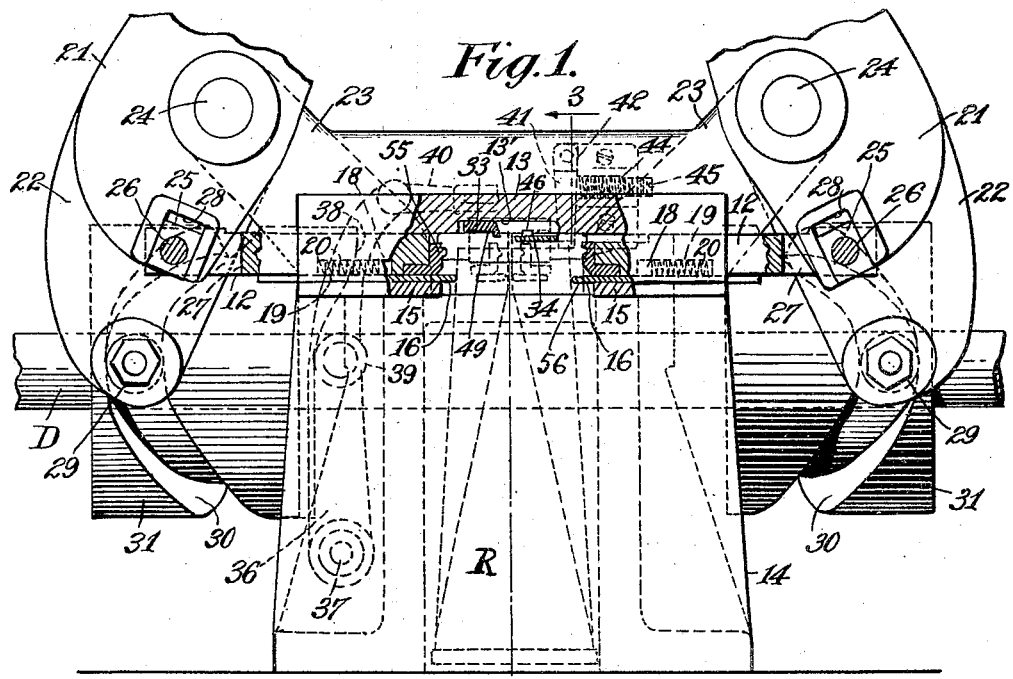

Figure 10 is an enlarged sectional view of the severing means in initial severing position relative to a collapsed receptacle end; and Figure 11 is a view similar to Figure 10 showing the severing means in fully actuated position with a closure member placed on the receptacle prior to positioning the same in abutting relation with the severing means.

In the embodiment of the invention illustrated the mechanisms for collapsing the open receptacle end, and forming, feeding and sealing a closure member thereto are similar to that disclosed in the application of E. L. Jones, Serial No. 469,058, filed July 19, 1930. The operative parts are mounted upon a table T supported by suitable standards, not shown, and adapted to rotatably support a drive shaft D.

Filled conical receptacles R having the upper ends open are intermittently delivered by a conveyor or other suitable means (shown in a conventional way at C) relative to devices of means to collapse the open end by squeezing together the opposite marginal portions and seal a closure member to the collapsed receptacle end, and comprising a pair of main slides 12 slidably mounted in a recess of channel shape in cross section of a shelf portion 13 extended over the receptacle delivering conveyor from a frame 14 mounted upon the table T, the shelf being spaced from the conveyor a distance somewhat greater than the height of the receptacle, the slides being retained in the recess by plates 15 secured to the portion 13 to extend below the slides. The open end of the receptacle is collapsed by a pair of auxiliary slides 16 substantially of T shape slidably mounted in reduced portions of recesses in the retaining plates 15 extending centrally thereof, as shown in Figures 3 and 4, one of the auxiliary slides having portions projected forward from the opposite ends of the T head to serve as gauges for the receptacle, as shown in dotted lines at 17 in Figure 4. The auxiliary slides are operatively connected with the main slides 12 to participate in the movement thereof and have independent movement relative to the main slides by a block 18 fixed to the auxiliary slides engaging an elongated recess 19 in the under surface of each main slide and normally urged to position forward of the opposed faces of the main slides by springs 20 in the recesses 19 confined between the end wall of the recesses and the blocks 18.

Figure 2:
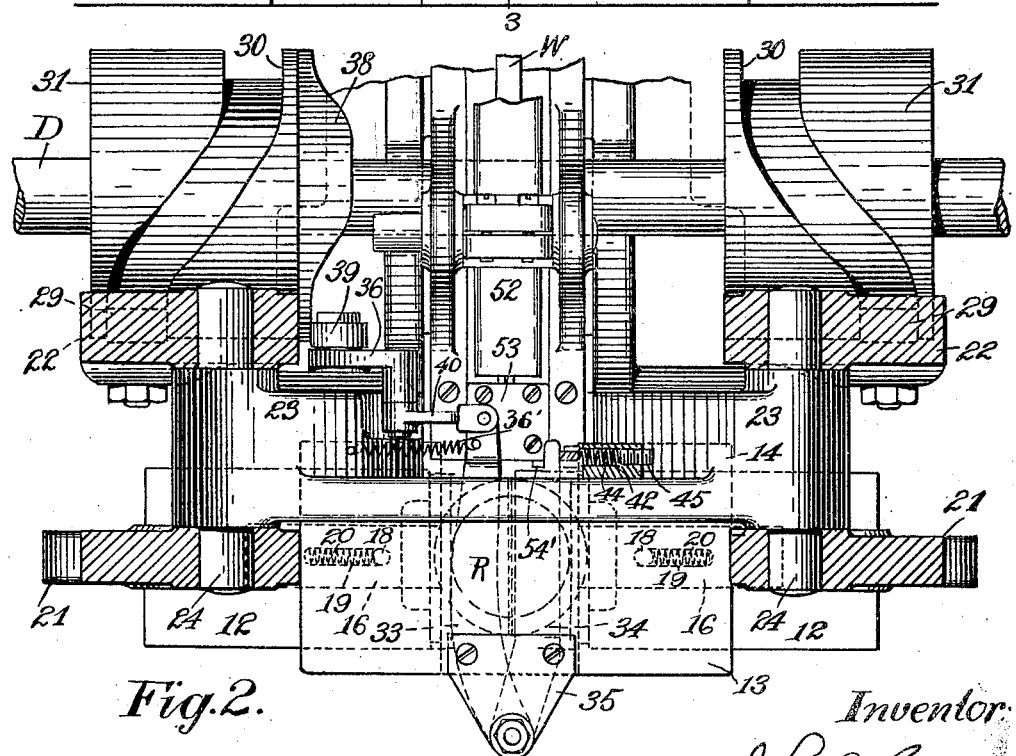
Figure 2 is a plan view of the apparatus looking at the top of Figure 1.

The slides are reciprocated toward and away from each other during the positioning of a receptacle relative thereto by a pair of levers, each lever embodying a pair of arms 21, 22, shown in Figures 1 and 2 with the upper end portions of said arms broken away, and at which portions the arms are connected and weighted, the levers being pivotally supported by fixed arms 23 extended upward and laterally from the shelf portion 13 of the frame 14 and having a boss at the free ends to fit between the lever arms which are mounted thereon by pins 24 engaged in perforations in said lever arms. Arms 21 of the levers are operatively connected with its slides 12 by blocks 25 loose on pins 26 mounted in the legs of bifurcated portions 27 at the outer ends of the slides 12 with the blocks slidably engaging bifurcations 28 in the ends of the arms 21 (Figure 1). The slides are reciprocated by rollers 29 rotatably carried by pins fixed in the ends of the arms 22 extended beyond the arms 21 and engaging cam grooves 30 in drums 31 fixed on shaft D at opposite sides of the frame 14.

The receptacles are supported relative to and actuated toward and away from the slides by a plunger 31', only partly shown in Figure 3, having an annular head 32 arranged with ears to engage the marginal portions of the bottom of the receptacle, said plunger being adapted to be moved in a manner shown and described in the aforementioned application in an upward direction prior to the movement of the slides toward each other to position the open end of the receptacle between the auxiliary slides 16, as shown in Figure 6, when said slides are actuated and the opposite wall portions of the receptacle are squeezed together in flat parallel relation, as shown in Figures 2, 4 and 7.

After the open end of the receptacle has been collapsed the plunger is moved a further increment in an upward direction to position the edges of the collapsed receptacle end relative to severing means to sever the edges so that they will extend in an even and the same plane, said severing means comprising a pair of cutters in the form of blades 33, 34 pivotally mounted at one end on a triangular bracket 35 fixed at the bottom to and extended laterally from the shelf portion 13, the cutters being superposedly mounted relative to each other in a recessed portion of the shelf 13, as shown at 13', the cutting edge of the cutter 34 being arranged to extend in a straight plane and the cutting edge of cutter 33 being curved or inclined relative thereto along the longitudinal axes of said cutters, as shown in Figures 2, 4 and 5. The edges of the receptacle are severed in sequence to the positioning of the receptacle by the plunger 31' relative to the cutters by imparting movement to the free end of the cutter 33 by an arm 36 pivotally mounted at one end on the front connecting wall of frame 14, as at 37 in Figures 1 and 3, and adapted to be reciprocated in sequence to the second increment of movement of the supporting plunger 31' by a cam face arranged on an edge of a ring member 38 fixed to and extended laterally from the drum 31 adjacent the arm 36 engaged by a roller 39 carried by the arm 36 intermediate the ends thereof, the arm being urged by a spring 36' to cause the roller to engage and follow the cam. As the roller 39 engages and follows the raised portion of the cam face the free end of the arm will be actuated in a direction toward the free end of the cutter 33 to which the arm is connected by a link 40 pivotally connected at one end to the arm 36 and the opposite end being bifurcated with the legs of the bifurcation engaging opposite sides of and pivotally connected to the free end of the cutter, said cutter end being offset to permit free movement thereof relative to a portion of closure member feeding means carried by the frame 14, as shown in Figure 3, and to be described hereafter. During the actuation of the cutter 33 to severing position, the cutter 34 is yieldingly maintained in parallel relation to the adjacent side of the receptacle, as shown in dotted lines in Figure 2, by a finger 41 pivotally suspended from a vertical extending portion of the frame 14, as shown at 42 in Figures 1 and 2, with the free end yieldingly urged into engagement with an extended portion 43 of the free end of the cutter 34 by a coiled spring 44 seated in a recess extending through the frame portion 42, the spring being retained therein and adapted to be adjusted by a screw 45 threaded into the recess in engagement with the end of the spring opposite the end abutting the finger. After the edges of the receptacle have been severed the actuated cutter 33 will continue to move over the other cutter as the roller 39 engages the high portion of the cam edge 38 when the cutting edge of cutter 33 abuts a block 46 fixed to and projecting from the cutter 34, whereby the movement of the cutter 33 will be imparted to the cutter 34 actuating the cutter 34 away from the severed receptacle end into a recess 47 in the clamping edge of the adjacent main slide 12, as shown in Figures 8 and 11, the cutter 34 engaging in said recess in the receptacle collapsing position of the slides, as shown in Figures 7 and 10.

After severing the collapsed receptacle end and the positioning of the cutter 34 away from the receptacle a closure member 48 of V shape in cross section is positioned over the collapsed and severed receptacle end. While the closure member may have been formed and engaged over the collapsed receptacle end, it is shown as a portion of a closure member forming web W formed to constitute a closure member which is formed and positioned over the collapsed receptacle end as the strip or web is fed. To permit feeding of the closure member in a direction parallel to the severed receptacle edges, the cutting edge of cutter 33 is arranged on a ridge extending from the body thereof to form a recess 49 and an unobstructed passage for the closure member in the actuated position of the cutters as shown in Figures 8, 9 and 11.

The closure member forming strip or web W is intermittently fed from a roll carried by a reel, not shown, by slides of punch and die mechanism to recess marginal portions of the web, as shown at 50 in Figures 3 and 4, said mechanism being illustrated and described in the aforementioned application. The formed and recessed web is then passed over a plate 51 mounted on the frame 14 (Figure 3) and being in the form of a rib progressively shaped from the rear end to intermediate the length thereof to V shape in cross section whereby the web is progressively formed to V shape in cross section by a reciprocating die member 52 having a longitudinal recess corresponding to the shape of the plate 51 and adapted to be reciprocated toward the plate during the periods of rest of the punch and die slides, as described in the said mentioned co-pending application. The marginal recesses in the web are spaced equal distances apart to form sections between the recesses of a length equal to the width of the collapsed receptacle end and such sections are positioned on the severed receptacle end with the connecting portion of the succeeding web section formed by the rear recess of the section engaged on the receptacle positioned relative to the forward end of a guide member 53 mounted on the frame 14 having a V shaped channel therethrough in alinement with the plate 51 and serving as a cutter to co-operate with a cutter 54 mounted on one of the main slides 12 and extended beyond the face thereof to sever said connecting web portion intermediate the ends of the web recess during the actuation of said slides toward said closure member and prior to the engagement of said slides with the closure member on the receptacle.

The cutter 34 is positioned to extend in a straight plane in the normal position thereof under the force of the spring 44 by the extended end 43 abutting against an ear 54' extending upward from the cutter portion of the cutter 54.

To assure a liquid tight seal the V portion of the closure member is engaged against the severed straight edges of the receptacle by imparting a still further increment of movement in an upward direction to the supporting plunger 31' to abut the closure member against the body portion of the cutter 33, as shown in Figure 8, prior to the engagement of jaws 55, 56 fixed to the clamping faces of the main slides with the opposite legs of the closure member, jaw 55 being arranged with a longitudinal rib and jaw 56 having a longitudinal recess corresponding in cross section to the rib on jaw 55, whereby the closure member is sealed to the receptacle by fluting the closure member and interlocking the material thereof with the material of the interposed receptacle, as shown at 57 in Figure 9. Simultaneously with the sealing of the closure member to the severed receptacle end the extended ends formed by the severed connecting portions of the web W are folded to extend at right angles to the body of the closure member and relative to the opposite sides of the collapsed receptacle end by the cutter 54 and a plate similar to said cutter secured to the side of the slide 12 opposite the side arranged with said cutter and projected beyond the jaw of said slide.

The cutters 33, 34 remain in the position shown in Figures 8, 9 and 11, relative to the slide recess 47 by the engagement of the roller 39 with the high portion of the cam 38 which extends for a distance sufficient to permit the placing of a closure member on the receptacle, abutting the closure member against the cutter 33 and sealing the closure member to the receptacle.

After the closure member has been sealed to the collapsed receptacle end receding movement is imparted to the collapsing and closure member applying means and the severing means, and the mechanism for lifting the receptacle from the conveyor to present it to such means is actuated to reposition the receptacle upon the reciprocal seat of the conveyor to be further transported thereby and station the same relative to means for folding the extending ends of the closure member to embrace the opposite leg of the closure member, but as such means does not constitute a part of the invention of this application illustration and description is not deemed necessary.

It will also be obvious that various modifications may be made in construction and arrangement of parts without departing from the scope of the invention.

Having thus described my invention, I claim:

1. In apparatus for closing and sealing the open end of receptacles, a pair of members reciprocatory toward and away from each other and between which a receptacle is positioned to collapse the open end thereof, severing means mounted in juxtaposed relation to and operable in the plane of the collapsing members, and means adapted to be actuated in sequence to the collapsing movement of the collapsing members to engage the receptacle and position the collapsed end thereof relative to the severing means for severing the end portion of the collapsed receptacle end in a straight line.

2. Apparatus for closing and sealing the open end of receptacles as claimed in claim 1, wherein the severing means comprises a pair of cutters adapted to be actuated toward each other in sequence to the positioning of the collapsed receptacle end between the cutters.

3. In apparatus for closing and sealing the open end of receptacles, a pair of members reciprocatory toward and away from opposite sides of a receptacle positioned between the same to collapse the open end thereof, severing means juxtaposed to and operable in the plane of movement of the collapsing members, and receptacle supporting means adapted to be actuated in sequence to the collapsing of the receptacle to impart an increment of movement to the receptacle to position the end portion of the collapsed end relative to the severing means for severing the same, and the receptacle supporting means then being further actuated to position a closure member engaged on the collapsed and severed receptacle end into intimate engagement with the severed edges of the receptacle.

4. Apparatus for closing and sealing the open end of receptacles as claimed in claim 3, wherein the receptacle collapsing members are arranged with portions adapted to be actuated in sequence to the positioning of the closure member in intimate engagement with the severed edges of the receptacle to engage and seal the closure member to the collapsed and severed receptacle end.

5. Apparatus for closing and sealing the open end of receptacles as claimed in claim 1, wherein the severing means comprises a pair of cutters adapted to be actuated toward each other and adapted to be moved after severing the receptacle end toward one of the collapsing members and in superposed relation to the severed receptacle end.

6. Apparatus for closing and sealing the open end of receptacles as claimed in claim 3, wherein the closure member is of V shape in cross section and is positioned in intimate engagement with the severed edges of the receptacle by abutting the closure member engaged on the collapsed receptacle end against a portion of the severing means.

7. In apparatus for closing and sealing the open end of receptacles, a pair of members movable toward and away from opposite sides of a receptacle positioned between the same to collapse the open end thereof, a pair of cutters superposed to said members and one cutter juxtaposed to the other cutter, and means to actuate one cutter toward the other cutter in sequence to the reciprocation of the members to collapse the receptacle to sever the end portion of the collapsed receptacle in an even plane.

8. In apparatus for closing and sealing the open end of receptacles, a pair of members reciprocatory toward and away from opposite sides of a receptacle positioned between the same to collapse the open end thereof, a pair of cutters pivotally mounted at juxtaposed ends, means to actuate one cutter toward the other cutter in sequence to the reciprocation of the members to collapse the receptacle to sever the end portion of the collapsed receptacle in an even plane, and an abutment carried by the inactive cutter and engaged by the actuated cutter after severing the receptacle to move the cutters laterally from the severed receptacle end by the continued movement of the actuated cutter to permit the engagement of a closure member upon the severed receptacle end.

9. Apparatus for closing and sealing the open end of receptacles as claimed in claim 8, wherein the cutter actuating means is connected to the free end of the actuated cutter to impart severing movement thereto.

10. In apparatus for closing and sealing the open end of receptacles as claimed in claim 7, means to yieldingly urge the inactive cutter to position parallel to one side of the collapsed receptacle end.

11. Apparatus for closing and sealing the open end of receptacles as claimed in claim 3, wherein the severing means comprises a pair of juxtaposed cutter blades, one of said blades being arranged with a recess at the rear of the cutting edge against which the closure member on the collapsed receptacle end is positioned to engage the same in intimate contact with the severed receptacle edges.

12. In apparatus for closing and sealing the open end of receptacles, a pair of main slides supported to have movement toward and away from each other and a pair of auxiliary slides movable with and relative to the main slides and adapted for the engagement of the open end of a receptacle between the same, means to actuate said slides to effect engagement of the receptacle below the open end by the auxiliary slides to squeeze together the opposite wall portions of the receptacle to close the same, and a pair of cutter blades movably mounted in juxtaposed relation to the main slides and actuated in sequence to the actuation of the auxiliary slides to sever a portion from the closed receptacle and extending above the auxiliary slides maintaining the receptacle in closed condition, said slide actuating means being operative to further move and engage the main slides with a closure member engaged on the closed and severed receptacle end to clamp and seal the same to the receptacle end.

13. In apparatus for closing and sealing the open end of receptacles, a pair of members mounted to have movement toward and away from each other, means connected with said members to cause them to advance toward each other and collapse the open end of a receptacle engaged between the members, and cutter means operative in sequence to the receptacle collapsing movement of said members to sever a portion of the collapsed receptacle end above the engaged portion, and another part of said members upon being further advanced by the actuating means therefor being caused to engage the receptacle above the engaged portion, whereby a closure member placed on the collapsed and severed receptacle end will be sealed to the closed receptacle end by said members.

14. In apparatus for closing and sealing the open end of receptacles, a pair of slides mounted to have movement toward and away from each other, a pair of auxiliary slides carried by the first slides to participate in the movement of and have movement relative to said first slides, actuating means for the slides, said auxiliary slides being operative as the slides are moved toward each other to collapse the open end of a receptacle positioned between the slides, means operative in sequence with the receptacle collapsing movement of the slides to sever a portion from the collapsed receptacle end, and said slide actuating means being operative to move the first slides toward each other relative to the auxiliary slides engaging the receptacle whereby to clamp and seal to the receptacle a closure member engaged upon the collapsed and severed receptacle end.

15. In apparatus for closing and sealing the open end of receptacles, means movable toward and away from each other and between which the open end of a receptacle is adapted to be positioned to collapse the same, means superposed to the collapsing means relative to which the collapsed receptacle end is positioned to sever a portion from the collapsed receptacle end, means associated with the collapsing means to clamp and seal a closure member engaged on the collapsed and severed receptacle end to the collapsed and severed receptacle end, and means to yieldingly actuate the receptacle collapsing means to and maintain said means in receptacle collapsing position during the movement of the closure member clamping and sealing means to closure member clamping and sealing position.

Signed at the city of New York, in the county of New York and State of New York, this 4th day of December, 1930.

JOHN O. SEIFERT.